United States Patent [19]

Ladeburg et al.

[11] Patent Number: 4,672,166
[45] Date of Patent: Jun. 9, 1987

[54] CONTROL CIRCUIT FOR THE CURRENT OF A WELDING TRANSFORMER

[75] Inventors: Jörg Ladeburg; Robert Becker; Bernhard Dreymann; Thomas Gensler; Robert Ulrich, all of Büdingen; Paul Wahrenbruch, Gedern; Reinhard Blaser, Büdingen, all of Fed. Rep. of Germany

[73] Assignee: Accumulatorenfabrik Sonnenschein GmbH, Fed. Rep. of Germany

[21] Appl. No.: 824,273

[22] Filed: Jan. 30, 1986

[30] Foreign Application Priority Data

Feb. 7, 1985 [DE] Fed. Rep. of Germany ....... 3504159

[51] Int. Cl.4 ............................................. B23K 11/24
[52] U.S. Cl. ................................... 219/110; 219/91.1; 219/109
[58] Field of Search ..................... 219/110, 109, 86.41, 219/91.1, 130.01

[56] References Cited

U.S. PATENT DOCUMENTS 2,510,956  6/1950  Brown ................................. 219/91.1
3,725,636  4/1973  Toth ................................. 219/130.01

Primary Examiner—Clifford C. Shaw
Attorney, Agent, or Firm—Shlesinger, Fitzsimmons & Shlesinger

[57] ABSTRACT

The invention is directed to a control circuit for controlling the current of a welding transformer integrated in an industrial robot. For the purpose of achieving a simpler, more accurate and more reliable detection of contact between the welding tongs (4, 5) and the parts (11, 12) to be joined by welding, there are provided a high-frequency generator (1) for supplying measuring current to the secondary circuit (2) of the welding transformer, an impedance measuring circuit (3), an additional impedance (7) for increasing the impedance of the secondary current (2) to high frequency, an interrupter circuit (8) for interrupting the welding current, and a comparator for enabling the welding current merely in the presence of a differential voltage signal which corresponds to complete contacting of the two parts to be joined by welding.

6 Claims, 2 Drawing Figures

CONTROL CIRCUIT FOR THE CURRENT OF A WELDING TRANSFORMER

Control circuits of the type described herein are used to monitor contacting of the welding tongs so that the high welding power will only be turned on when proper contact between welding tongs and parts to be welded has been made. So far, the following methods have been employed:

1. Mechanical position monitoring and position detection of the welding tongs. Due to the large dimensional tolerances of the workpiece, it is impossible thus to obtain a clear indication as to contacting.

2. The hydraulic pressure in the elevating cylinder for actuating the welding tongs, which pressure is applied to the workpiece by the welding tongs, is used to determine contacting and to switch the welding power. But this requires a highly accurate constant pressure of the operating pressurized air and, moreover, requires operation by pressurized air in any case, whereby the field of application is restricted.

3. Through the welding transformer, an a.c. voltage (50 Hz) is applied to the tongs so that upon contacting of the tongs a secondary current will be developed which is only a fraction of the welding current. However, such an arrangement requires intervention in the current control. Furthermore, due to the low frequency, evaluation and switching rate are slow.

The invention is based on the object of providing a control circuit in accordance with the preamble of claim 1 in such a way that the above-mentioned drawbacks of the prior art are avoided and that easy, accurate and reliable determination of contacting is made possible which is independent of dimensional tolerances of the workpiece and of the operating pressure of the actuating mechanism for the welding tongs, while the welding power control shall not be influenced.

In accordance with the invention this object is solved by the features of the characterizing portion of claim 1. Further improvements of the invention are protected in the subclaims.

An embodiment of the invention is illustrated in the drawing, in which.

Figure 2:
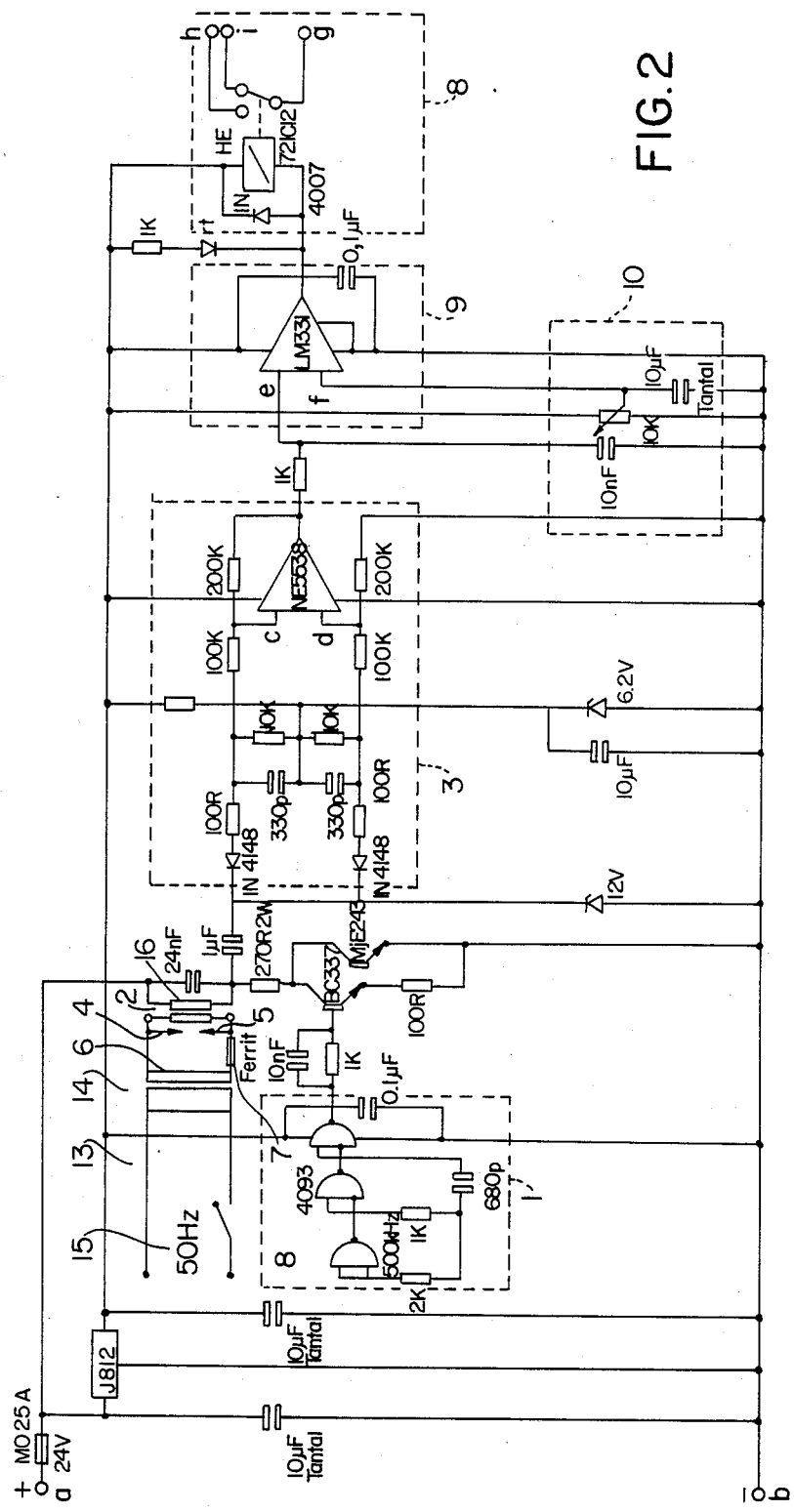
FIG. 2 is the circuit diagram of a detailed circuitry.

Table 1 lists the electronic components used in the circuit illustrated in FIG. 2.

Figure 1:
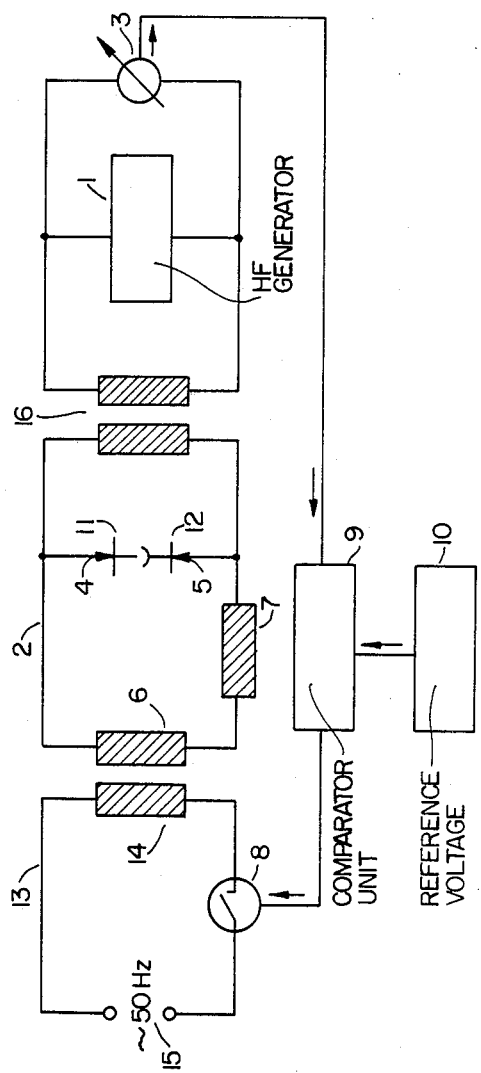
FIG. 1 is a schematic view showing the layout of a circuit.

The left-hand portion of FIG. 1 shows a 50 Hz power supply 15 which in combination with a primary winding 14 constitutes the primary circuit 13 of the welding transformer 14, 6, the secondary winding 6 of the welding transformer being part of a secondary circuit 2. An interrupter in the form of a valve 8 is connected in series to the primary circuit 13 and controls the current flowing through the primary winding 14 and thus the welding current.

Through the secondary winding 6 the welding current flows within the secondary circuit 2 via a high-frequency reactor 7 and the secondary winding of a high-frequency transformer 16. In parallel in this welding power loop 2 with the secondary winding 6 the welding tongs 4 and 5 are provided each of which contacts a workpiece 11 and 12, respectively, of the workpieces to be joined by welding. The high-frequency a.c. voltage induced by the high-frequency transformer 16 drives a current via the welding tongs 4 and 5 through the workpieces 11 and 12 when said power circuit is closed. The high-frequency reactor 7 prevents a high-frequency current from flowing through the secondary winding 6 of the welding transformer 14, 6.

The primary winding of the high-frequency transformer 16 is connected in series with a measuring circuit 3, wherein a high-frequency generator 1, for instance a high-frequency oscillator, is disposed in parallel in this high-frequency current loop constituted with the primary winding of the high-frequency transformer 16 and the measuring circuit 3.

The measuring circuit 3 detects the high-frequency voltage drop at the high-frequency transformer 16 and thus at the welding tongs 4, 5 and converts said voltage drop to a proportional d.c. voltage. This d.c. voltage is applied to a comparator 9 for comparison thereof with a preset reference voltage supplied by a reference voltage source 10. When the d.c. voltage from the measuring circuit 3 is below said preset value, the differential signal supplied by the comparator will switch the valve 8 to close the primary circuit 13, so that welding current may flow.

FIG. 2 illustrates details of circuit design for implementing the basic circuit arrangement shown in FIG. 1.

Here, too, the 50 Hz power supply 15 will be apparent, which is connected to the primary circuit 13 of the welding transformer 14, 6, wherein the valve 8 is connected in series thereto. The secondary winding 6 of the welding transformer forms part of the secondary circuit 2 and together with the secondary winding of the high-frequency transformer 16 constitutes the secondary circuit 2. Into this secondary circuit 2 a high-frequency impedance 7 in the form of a ferrite core is connected, and in parallel thereto the two welding tongs 4 and 5 will be apparent each of which respectively makes contact with one of the two parts to be joined by welding. Furthermore, the high-frequency generator 1 will be apparent; as regards the meaning and dimensioning of the various circuit symbols, reference shall be made to the enclosed Table 1. Significant components are a transistor circuit and a triple NAND-circuit. Likewise, resistors and capacitors are provided at certain suitable locations. It should be noted that for purposes of simplicity some capacitances are merely referenced p which should more accurately be pF.

The detailed layout of the measuring circuit 3 will also be apparent from FIG. 2. The heart of this circuit is an operational amplifier with two inputs c and d, which are connected to the transformer 16 and at the same time to the high-frequency generator 1 via resistances and capacitors disposed at suitable locations and especially via two rectifier diodes connected to each of the inputs of the operational amplifier. The output of the measuring circuit 3 is connected to the comparator whose principal component again is an operational amplifier with two inputs e and f. Both inputs are also connected to a reference voltage source 10.

The output of the comparator 9 is connected to the interrupter circuit 8 whose principal component is a specific Hamlin-type reed relay. Certain electrical contact points are referenced g, i and h.

The contact a of the circuit shown in FIG. 2 represents the connection of that circuit of the transformer 16, which is connected to the measuring circuit 3, with the positive pole of a d.c. current supply of 24 V via a fuse M of 0.25 A, whereas the other contact of said circuit is connected via a capacitor 1 $\mu$F and a Zener diode 12 V to the negative pole b of said d.c. current supply. Preferably, the d.c. power supply is of the type, normally already provided at the head of an industrial robot and normally used to supply various subassemblies. Therefore the circuit is designed such that it is matched for connection to such an already provided 24 V d.c. current supply and does not require an additional voltage supply except for the 50 Hz mains supply. For instance, this d.c. voltage is applied via the fuse M 0.25 A to the input capacitor 10 μF of the control circuit. The logic means and the signal processing means are supplied with a d.c. voltage of 12 V via a fixed-voltage regulator J 812 including a subsequent smoothing capacitor of 10 μF. Merely the high-frequency current is derived direct from the input capacitor of 10 μF so as to prevent any feedback to the signal processing means.

The CMOS-gates and the comparator 9 are likewise inhibited with 0.1 μF.

In accordance with the embodiment illustrated in FIG. 2, the high-frequency generator 1 comprises two CMOS-NAND-gates 4093 which in combination with the RC circuit of 1 kΩ, 2 kΩ, 680 pF constitute a square-wave generator of 500 kHz. Via the current-limiting and edge-shaping RC-circuit of 1 kΩ and 10 nF, a third NAND-gate drives the Darlington circuit comprising the components BC 337, MJI 243 and 100 Ω. The resistor of 270 Ω and 2 W is used for current limiting, the capacitor of 24 nF is used for edge improvement. The reactor 7 constitutes a high impedance for the high frequency or a short-circuit when the welding tongs have made contact.

Below, the operation of the measuring circuit 3 according to FIG. 2 is described in detail. Via a coupling capacitor of 1 μF the high-frequency voltage is supplied to a full-wave rectifier including a smoothing element, rectification being effected by the components 1N 4148, 100Ω, 330 pF, 1 kΩ, and amplitude limitation being effected via the component ZD of 12 V. The centre of the full-wave rectification is fixed to 6.2 V, see component ZD of 6 V, 2.10 μF. At the smoothing capacitor of 330 pF there will thus result an amplitude-dependent differential d.c. voltage. This d.c. voltage is amplified in the operational amplifier NE 5538 by the factor 2 and is smoothed, see in this respect the components 200 kΩ/100 kΩ and, respectively, 1 kΩ, 10 nF.

In FIG. 2, the comparator 9 consists substantially of the component LM 331. This component compares the d.c. voltage with the preset reference voltage, see the components 1 kΩ, 10 μF. When the switching threshold is detected, the comparator output will go to "low", the relay HE 721 C 12 will pick up, and the indicator LED, 1 kΩ, will flash. The diode 1 N4007 protects the comparator against induced negative voltages. The relay output as a floating change-over contact will be available for subsequent control tasks.

Table 1 lists the components used in the embodiment illustrated in FIG. 2. For clarity's sake, all resistors are referenced R, the potentiometer is referenced P, the capacitors are referenced C, the diodes are referenced D, the light-emitting diode is referenced LED, the transistors are referenced T, the control elements are referenced IC, the relay is referenced K, the fuse is referenced F, the transformation is referenced Ü. All components of the same type are numbered consecutively. For the sake of clarity, FIG. 2 itself merely shows the values or the type designations of these compo ents

TABLE 1

Monitoring of Welding Tongs Contact
List of Components

| | | | |
|---|---|---|---|
| R1 | metal-film resistor | 2 k | 0.25 W |
| R2 | " " " | 1 k | " |
| R2 | " " " | 1 k | " |
| R4 | " " " | 100 R | " |
| R5 | wire-wound resistor | 270 R | 2 W |
| R6 | metal-film resistor | 100 R | 0.25 W |
| R7 | " " " | 100 R | " |
| R8 | " | 10 k | " |
| R9 | " " " | 10 k | " |
| R10 | " " " | 1 k | " |
| R11 | " " " | 100 k | " |
| R12 | " " " | 200 k | " |
| R13 | " " " | 100 k | " |
| R14 | " " " | 200 k | " |
| R15 | " " " | 1 k | " |
| R16 | " " " | 1 k | " |
| P1 | spindle-operated potentiometer | 10 k | 0.75 W |
| C1 | tantalum electrolyt.capacit. | 10 μF | 35 V |
| C2 | " | 10 μF | 35 V |
| C3 | ceramic capacitor | 680 pF | 50 V |
| C4 | " " | 100 nF | " |
| C5 | " " | 10 nF | " |
| C6 | " " | 1 μf | " |
| C7 | " " | 330 pF | " |
| C8 | " " | 330 pF | " |
| C9 | tantalum electrolyt.capacit. | 10 μF | 35 V |
| C10 | ceramic capacitor | 10 nF | 50 V |
| C11 | tantalum electrolyt.capacit. | 10 μF | 35 V |
| C12 | ceramic capacitor | 100 nF | 50 V |
| C13 | " | 6.8 nF | 50 V |
| D1 | Zener diode ZD 12 V 0.25 W | | |
| D2 | diode 1N4148 | | |
| D3 | diode 1N4148 | | |
| D4 | Zener diode ZD 6.2 V 0.25 W | | |
| D5 | diode 1N4007 | | |
| LED | light-emitting diode red | | |
| T1 | transistor BC 337 | | |
| T2 | transistor MJE 243 | | |
| IC1 | voltage regulator MC 7812 | | |
| IC2 | fourfold NAND MC 14093 | | |
| IC3 | op-amp NE 5538 | | |
| IC4 | comparator LM 311 | | |
| K1 | reed relay HAMLIN HE721C12 | | |
| F1 | fuse M 0.25 A | | |
| | ferrite 2 × U37/15 − 3C8 | | |
| U | transformer RM6-pot-type core/N 250 N1 = N2 = 35, 0 = 0.3 mm | | |

We claim:

1. A control circuit for controlling the current of a welding transformer suitable for use in an industrial robot, comprising two welding tongs (4,5) the first of which is clamped to a first one (11) of the workpieces (11, 12) to be joined by welding and the second (5) of which makes contact with the second workpiece (12) for initiating the welding operation, including means for automatically detecting contact between the second welding tong (5) and the second workpiece (12), and including a power supply (15) for the welding transformer (14, 6), characterized by (a) a high-frequency generator (1) for supplying measuring current to the secondary circuit (2) of the welding transformer, (b) an impedance meter (3) for high-frequency impedance measurement in a substantially isolated circuit coupled to the two welding tongs (4,5), which are disposed in parallel to the secondary winding (6) of the welding transfomer, (c) an additional impedance (7) for significantly increasing the impedance of the secondary circuit (2) of the welding transformer in respect of high frequency while the impedance for the welding current remains substantially unaltered, said additional impedance being provided in series with the secondary winding (6) of said welding transfomer and the welding tongs (4, 5), (d) an interrupter circuit (8) for interrupting the welding current, (e) a comparator (9) for comparing the high-frequency voltage drop at the welding tongs (4, 5) with a preset desired value supplied by a reference voltage source (10), said comparator supplying to the interrupter circuit (8) an initiating signal for welding the two-workpieces (11,12) only when there is a differential signal which corresponds to complete contact between said second welding tong (5) and said second workpiece (12).

2. A circuit as claimed in claim 1, characterized in that the power supply used is a d.c. voltage source provided at the head of an industrial robot which supplies a voltage of 12 V through a fixed-voltage regulator.

3. A circuit as claimed in claim 1 or claim 2, characterized in that the high-frequency generator (1) is connected in parallel in a high-frequency current loop with the impedance meter of the measuring circuit (3) and the primary winding of a transformer (16) whose secondary winding forms part of the secondary circuit (2) of the welding transformer in the form of a welding transformer loop (2; 6, 7) across which the two welding tongs (4, 5), which are to be contacted with each other, are connected, wherein the high-frequency generator drives a switching transistor in such a way that a square-wave voltage is applied to the welding tongs (4, 5) via a load resistor and a transformer (16).

4. A circuit as claimed in claim 1, characterized in that for the purpose of evaluating the amplitude of the high-frequency voltage the latter is applied via a capacitor to a voltage doubler connection with smoothing action, the centre point of said connection being fixed at 6.2 V, and that the obtained amplitude difference, after further amplification, is smoothed and is compared in the comparator (9) with the preset threshold value supplied by the reference voltage source (10), and that, when the value is below/above a predetermined difference signal, the comparator (9) outputs an initiating signal to the interrupter circuit (8) for enabling the welding current.

5. A circuit as claimed in claim 1, characterized in that the comparator (9) drives an LED-indicator and a relay.

6. A circuit as claimed in claim 1, characterized in that the comparator (9) drives an LED-indicator, an optical coupler or a transistor.

* * * * *